United States Patent [19]

Lund et al.

[11] Patent Number: 5,037,171

[45] Date of Patent: Aug. 6, 1991

[54] OPTICAL FIBER COUPLING STRUCTURE

[75] Inventors: Mark W. Lund, Peoria; Harold L. Hamilton, Jr., Tempe, both of Ariz.

[73] Assignee: The United States of America as represented by the Secretary of the Air Force, Washington, D.C.

[21] Appl. No.: 575,020

[22] Filed: Aug. 30, 1990

[51] Int. Cl.$^5$ ................................................ G02B 6/26
[52] U.S. Cl. ........................................ 385/38; 385/49
[58] Field of Search ............... 350/96.15, 96.17, 96.29, 350/96.3

[56] References Cited

U.S. PATENT DOCUMENTS

| | | | |
|---|---|---|---|
| 4,684,206 | 8/1987 | Bednorz et al. | 350/96.12 |
| 4,717,226 | 1/1988 | Mori | 350/96.10 |
| 4,726,641 | 2/1988 | Mori | 350/96.10 |
| 4,728,170 | 3/1988 | Robertson | 350/96.15 |
| 4,730,883 | 3/1988 | Mori | 350/96.10 |
| 4,865,417 | 9/1989 | Yamamoto et al. | 350/96.3 |

FOREIGN PATENT DOCUMENTS 0177928   4/1986   European Pat. Off. .......... 350/96.29

OTHER PUBLICATIONS

"Partially cladded triangular-cored glass optical fibers and lasers", Tynes, J. Opt. Soc. of America; vol. 64, #11, Nov. 1974, pp. 1415-1423.

Primary Examiner—John D. Lee
Assistant Examiner—Stephen W. Barns
Attorney, Agent, or Firm—Bobby D. Scearce; Doanld J. Singer

[57] ABSTRACT

A novel optical fiber structure is described which includes an end thereof for transmitting optical signals and substantially reducing reflections of optical signals thereat wherein the fiber end has a substantially flat end surface disposed at an angle to a plane perpendicular to the transmission axis of the fiber equal to or greater than $\sin^{-1}(NA/n)$ where NA is the numerical aperture and n is the index of refraction of the fiber core material, and the fiber outer surface has adjacent the end surface a flattened portion of preselected depth and length whereby substantially all paraxial and meridional optical signals propagated along the fiber axis are transmitted through the end surface and skew rays transmitted along the fiber are substantially attenuated near the fiber end.

5 Claims, 2 Drawing Sheets

OPTICAL FIBER COUPLING STRUCTURE

RIGHTS OF THE GOVERNMENT

The invention described herein may be manufactured and used by or for the Government of the United States for all governmental purposes without the payment of any royalty.

BACKGROUND OF THE INVENTION

The present invention relates generally to optical fiber coupler structures, and more particularly to a novel fiber structure and optical coupler configuration for reducing the reflection of optical signals at a fiber end.

The invention applies principally to optical systems wherein a common fiber is used for both transmit and receive functions. The fiber end may interface with a lens, mirror or similar optical element that collects light transmitted from the fiber and directs it as required by the function of the optical system. The element then may also collect received light and concentrate it on the same fiber end for propagation along the fiber to an optical detector to accomplish the receive function.

A significant and persistent problem exists with this type of optical system. As transmitted light arrives at the exit surface of the fiber, a portion (typically ~4%) of the light is reflected back into the fiber according to Fresnel's laws of reflection and propagates back through the fiber to the optical detector in the same manner as the desired receive signals. This transmitter leakage is often greater in magnitude than the desired receive signals, and may mask the desired signals and/or saturate the optical detector so that no receive signals can be detected. The purpose of this invention is to greatly reduce this undesired fiber exit surface reflected light.

The invention describes an optical fiber structure for reducing undesirable reflections of optical signals at the fiber end. Light rays may propagate along a fiber in either direction in any of three general forms, viz., as axial rays along the optical axis, as paraxial rays essentially parallel to the optical axis, or as skew rays transmitted in helical fashion around the optical axis. Light reflections from an interface at a fiber end may return as interference down the fiber length to a receiver or other optical system to which the fiber is connected. In order to ensure that most fiber end reflected optical signals propagated along the fiber are reflected out of the acceptance cone of the fiber, the fiber end through which the signals are transmitted is ground and polished at preselected angle to prevent paraxial rays from achieving perpendicular or near perpendicular reflection from the fiber end. Attenuation of skew rays is ensured by providing a flattened portion of preselected length and depth at the angled end of the fiber. The fiber may interface at the angled end with an optical coupler of suitable structure for accommodating transmission of an optical signal across the angled fiber end at an angle to the transmission axis of the fiber.

It is therefore a principal object of the invention to provide an improved optical fiber and coupler structure.

It is another object of the invention to provide an optical fiber structure and optical fiber coupler configuration for reducing the reflection of optical signals at the fiber end.

These and other objects of the invention will become apparent as a detailed description of representative embodiments proceeds.

SUMMARY OF THE INVENTION

In accordance with the foregoing principles and objects of the invention, a novel optical fiber structure is described which includes an end thereof for transmitting optical signals and substantially reducing reflections of optical signals thereat wherein the fiber end has a substantially flat end surface disposed at an angle to a plane perpendicular to the transmission axis of the fiber equal to or greater than $\sin^{-1}(NA/n)$ where NA is the numerical aperture and n is the index of refraction of the fiber core material, and the fiber outer surface has adjacent the end surface a flattened portion of preselected depth and length whereby substantially all paraxial and meridional optical signals propagated along the fiber axis are transmitted through the end surface and skew rays transmitted along the fiber are substantially attenuated near the fiber end.

DESCRIPTION OF THE DRAWINGS

The invention will be more clearly understood from the following detailed description of representative embodiments thereof read in conjunction with the accompanying drawings wherein.

DETAILED DESCRIPTION

Figure 1:
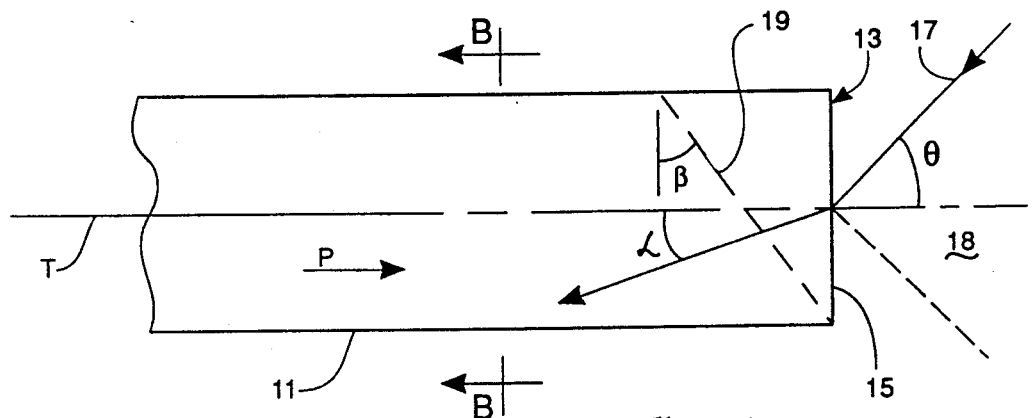
FIG. 1 is a view of an optical fiber end perpendicular to the transmission axis showing the acceptance cone of the fiber.

Referring now to the drawings, FIG. 1 illustrates an optical fiber 11 defined along transmission axis T. End 13 of fiber 11 is configured perpendicularly of axis T to define end surface 15. The acceptance cone of fiber 11 may be defined by the half apex angle $\theta$ and by a corresponding angle $\alpha$ at which light beam 17 may be refracted at end surface 15 and propagated along fiber 11. Angle $\alpha$ may be shown to be given by, $$\sin \alpha = NA/n$$

where NA is the numerical aperture, and n is the refractive index of the material comprising fiber 11. Fiber 11 may comprise any material customarily used in optical fibers, including, but not necessarily limited to fused silica, polymethylmethacrylate, fluorite and crown glass. In accordance with a governing principle of the invention, end 13 of fiber 11 is ground and polished at angle $\beta$ to a plane perpendicular to axis T to define an angled surface 19 such that the reflected portion of all axial rays and most skew rays transmitted in direction P along axis T of fiber 11 are reflected out of the acceptance cone of fiber 11. Angle $\beta$ is selected depending on the refractive index of the material of fiber 11 to prevent rays P from perpendicular or near perpendicular incidence with surface 19. Reflections from angled end 13 should occur at a range of angles which lie outside the acceptance cone of fiber 11 so that any reflected rays at the angled end are substantially attenuated because the core does not propagate rays characterized by angles greater than $\alpha$. Assuming that the angled end of fiber 11 presents a flat, well defined surface 19 across which a light beam traveling along axis T may be refracted, geometric optics considerations show that, to a very good approximation, angle $\beta$ is defined as follows:

$$\beta > \sin^{-1}(NA/n)$$

The foregoing analysis is sufficient to ensure that reflected portions of meridional or paraxial rays traveling along fiber 11 are reflected at angles greater than the fiber acceptance angle and do not propagate back along axis T in the direction of the origin of the rays. A skew or helical ray can intersect surface 19 at an angle such that the reflected portion can propagate back down fiber 11, and finishing the fiber end as just described to ensure that reflected paraxial and meridional rays are not propagated will not at the same time eliminate all skew rays.

Figure 1A:
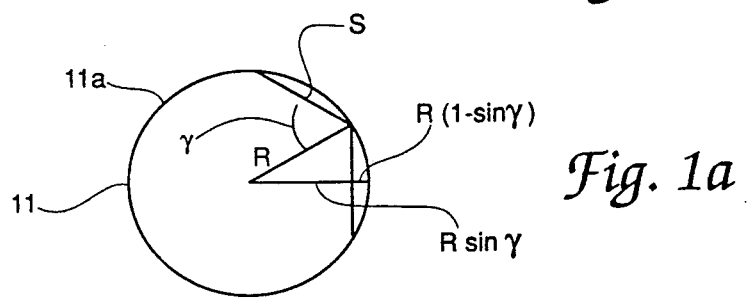
FIG. 1a is a view in section along line B—B of FIG. 1.

Referring to FIG. 1a, shown therein is a sectional view along line B—B of FIG. 1. Skew ray S with spiral angle $\gamma$ is confined to an outer annular portion of fiber 11 defined by outer surface 11a and a radius within fiber 11 equal to $R \sin \gamma$ where R is the fiber radius. The annular portion of fiber 11 within which skew rays of any significance herein are confined has thickness equal to $R(1 - \sin \gamma)$. Skew rays may be particularly difficult to eliminate because a fiber end finished according to the foregoing teachings may generate some skew rays from axial or near axial rays.

Figure 2:
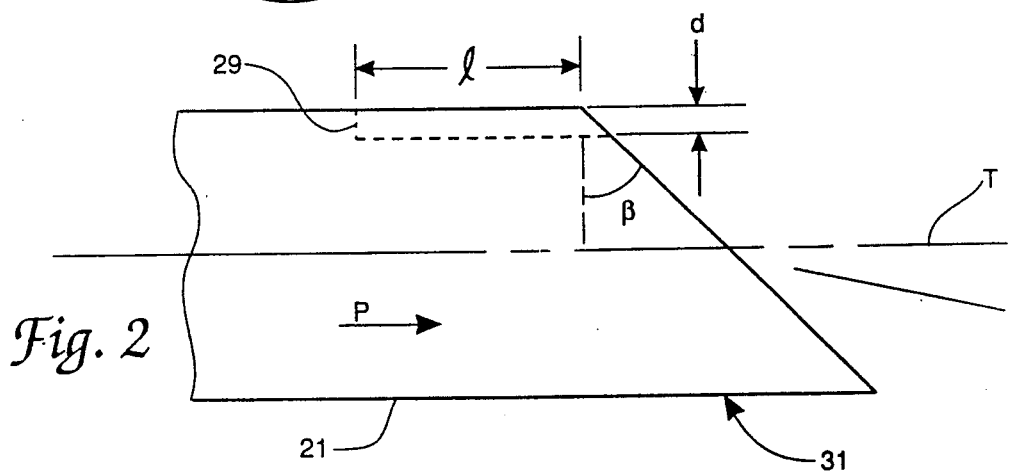
FIG. 2 is a view in axial section of an optical fiber ground and polished according to the invention.
Figure 3:
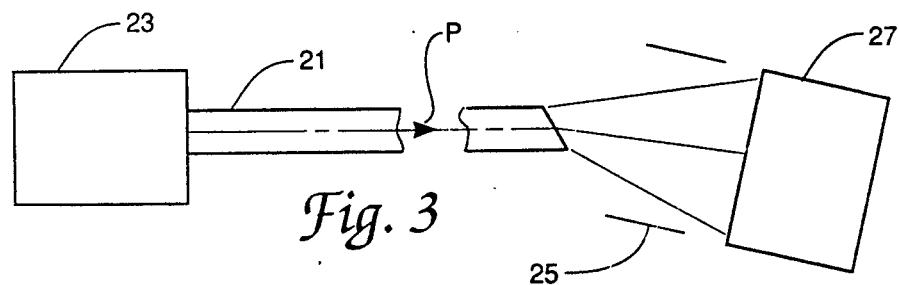
FIG. 3 illustrates the fiber of FIG. 2 operatively connected to an optical system accepting or responsive to optical signal transmitted along the fiber in both directions.

Referring now to FIG. 2, shown therein is a view in axial section of fiber 21 ground and polished according to the teachings hereof. FIG. 3 shows fiber 21 operatively interconnecting optical system 23, which comprises a transmitting source and a receiving detector, and an optical lens or mirror system 27 transmitting or responsive to an optical signal P transmitted along fiber 21. Any suitable coupling 25 for efficient transmission of signal P may be selected for use, as would occur to one skilled in the field of the invention, so long as coupling 25 is configured to accept signal P refracted out of fiber 21 as defined above. In such an arrangement, the location of a transmit/receive lens assembly as might form a part of 27 is adjusted to accommodate the difference in transmit angle and beam shape resulting from transmission across the angled end of fiber 21.

In accordance with a principal teaching of the invention, angled end 31 of fiber 21 may be ground or otherwise flattened to prescribed configuration to effectively convert skew or helical rays which form a part of signal P into axial or near axial rays before arriving at angled end 31. Accordingly, a short flattened section 29 of length 1 of fiber 21 at or near angled end 31 is ground or flattened to depth d, the dimensions of 1 and d being dependent on the diameter and numerical aperture of fiber 21. In any event, 1 and d are of sufficient size such that substantially all skew rays within the annulus defined above within fiber 21 are intersected at least once.

Figure 4:
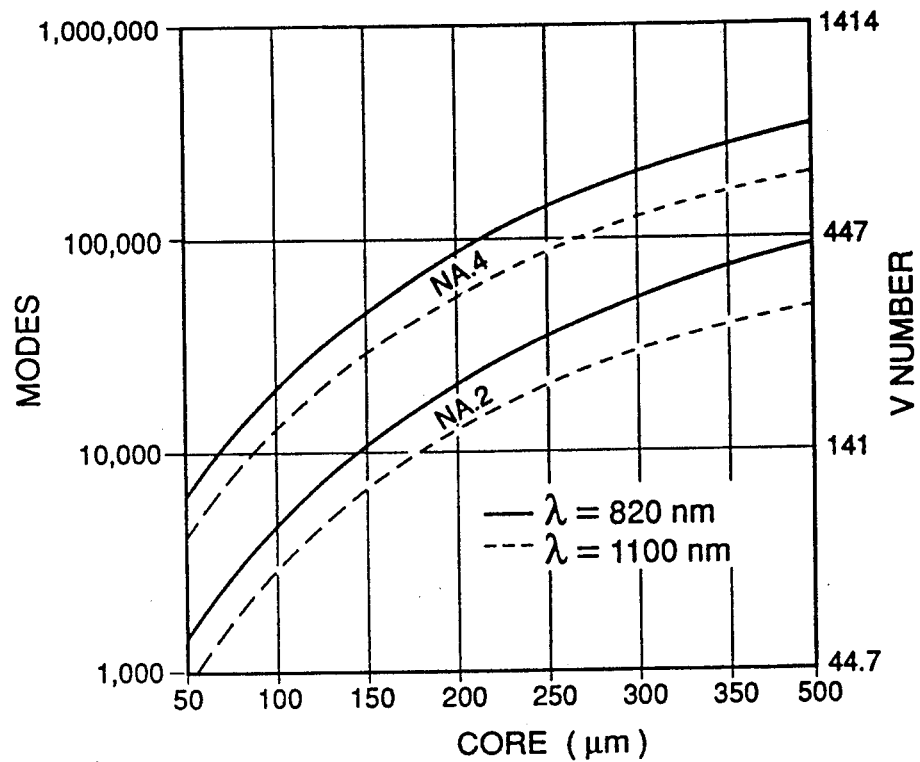
FIG. 4 shows curves of number of modes versus core diameter for two numerical apertures in the propagation of light along a fiber.

Light propagation in optical fibers can be described by Maxwell's equations. For boundary conditions defined by core diameter and core and cladding refractive indices, the number of modes propagating in a fiber is related to the square of the core diameter and square of the numerical aperture such as shown by the curves of FIG. 4. Some modes are made up of skew rays.

Figure 5:
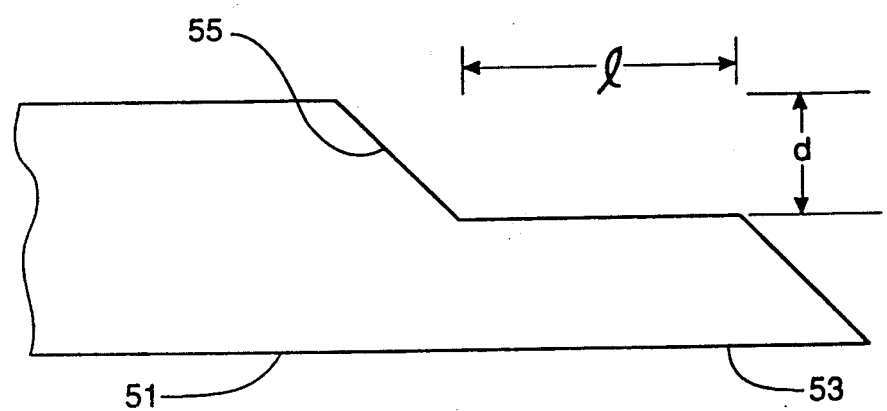
FIG. 5 shows in axial section a preferred flattened fiber end configuration for large depth of flattening.

In general, the purpose of flattened section 29 is to alter the characteristic propagation pattern of skew rays S and convert them into other propagatable or non-propagatable rays. Skew rays that arrive at flattened section 29 are reflected at a substantially different angle than the characteristic angle of reflection ($\gamma$ in FIG. 1a). The change in reflection angle can cause a skew ray to arrive at the core surface at an angle greater than $\alpha$. Values for d and 1 are best determined empirically since solutions to Maxwell's equations for a waveguide with the boundary conditions described above would not be unique. Selection of values for d and 1 is dependent upon amounts of reflection that are acceptable, the amount of power transmitted through the fiber end, and practical methods required to process fibers with a reasonable yield. Referring now to FIG. 5, shown therein in axial section is a fiber 51 with angled end 53. Reduction of skew rays in the least fiber 51 length practical may be achieved by intersecting all skew rays within one-half rotation using large d such as to one-half the fiber 51 diameter. Surface 55 defining the flattened portion of fiber 51 must also be angled as suggested in FIG. 5 to prevent Fresnel reflections at this surface. Such a depth of cut, though effective, may have associated fabrication problems, fiber weakening and loss of optical power transmitted in the paraxial and meridional rays. A more preferred depth of cut d may be defined by assuming skew rays S (FIG. 1a) to be characterized by an angle $\gamma > 60°$. From the relation shown in FIG. 1a, $$d = R(1 - \sin \gamma)$$

and, $$d = 0.13R \text{ for } \gamma = 60°.$$

In the extreme, the length of the flat could be the entire length of the fiber, however, which presents significant fabrication and desired mode propagation difficulties. It is preferable to evaluate the amount of light reflected from the fiber end which can be tolerated and provide a flattened section of length sufficient to reduce the reflected light below that tolerance level.

Actual attenuation of a skew ray by the flattened section takes place over many reflections within the fiber, e.g., in a fiber of 1000 microns diameter, an out-of-cone skew ray traveling along a 20 centimeter fiber length will experience of the order of 5000 reflections. Assuming even a small loss (attenuation) at each reflection, the skew ray intensity may be attenuated by many orders of magnitude; if the loss at each reflection is 0.002, the transmission of light along that ray is less than $5 \times 10^{-5}$ after 5000 reflections. Reflection losses will ordinarily be more than 0.002. Therefore, providing a depth d of about 13 per cent of the fiber diameter and length 1 of about 5 fiber diameters may be sufficient to reduce reflected light to insignificance.

The invention therefore provides an improved optical fiber and optical coupling structure. It is understood that modifications to the invention may be made as might occur to one skilled in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

We claim:

1. An optical fiber structure having an end thereof for transmitting optical signals projected along a transmission axis of said fiber, said fiber end configured to substantially reduce reflections of optical signals at said fiber end, said fiber end having a substantially flat end surface disposed at an angle to a plane perpendicular to said transmission axis, said angle being at least equal to $\sin^{-1}(NA/n)$ where NA is the numerical aperture and n is the index of refraction of the material comprising said fiber and said fiber includes a flattened portion on the outer surface thereof adjacent said end surface, said flattened portion being of preselected depth and length, whereby substantially all paraxial and meridional optical signals propagated along said axis of said fiber are transmitted through said end surface and skew rays transmitted along said fiber are substantially attenuated near said fiber end.

2. The fiber structure of claim 1 wherein said flattened portion on said fiber is of sufficient length to intersect at least once all skew rays transmitted along said fiber.

3. The fiber structure of claim 1 wherein said material comprising said fiber is selected from the group consisting of fused silica, polymethylmethacrylate, fluorite and crown glass.

4. The fiber structure of claim 1 wherein said flattened portion on said outer surface of said fiber has depth of about 13 to 50 per cent of the diameter of said fiber.

5. In a coupling structure for an optical fiber, and improvement wherein said optical fiber is configured at an end thereof for transmitting optical signals projected along a transmission axis of said fiber, said end configured to substantially reduce reflections of optical signals at said end, said end having a substantially flat end surface disposed at an angle to a plane perpendicular to said transmission axis, said angle being at least equal to $\sin^{-1}(NA/n)$, where NA is the numerical aperture and n is the index of refraction of the material comprising said fiber, and said fiber includes a flattened portion on the outer surface thereof adjacent said end surface, said flattened portion being of preselected depth and length, whereby paraxial and meridional optical signals propagated along said axis of said fiber are transmitted through said end surface and skew rays transmitted along said fiber are substantially attenuated near said fiber end, and an optical coupler interfacing said end surface of said fiber at said angle to said transmission axis for projection of optical signals at said angle to said transmission axis.

* * * * *